US012722730B2

(12) United States Patent
Ishii

(10) Patent No.: US 12,722,730 B2
(45) Date of Patent: Sep. 1, 2026

(54) COWLING STRUCTURE

(71) Applicant: SUZUKI MOTOR CORPORATION, Hamamatsu (JP)

(72) Inventor: Tatsuki Ishii, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 343 days.

(21) Appl. No.: 18/396,993

(22) Filed: Dec. 27, 2023

(65) Prior Publication Data

US 2024/0262444 A1 Aug. 8, 2024

(30) Foreign Application Priority Data

Feb. 2, 2023 (JP) ................................ 2023-014344

(51) Int. Cl.
*B62J 17/02* (2006.01)

(52) U.S. Cl.
CPC .................................... *B62J 17/02* (2013.01)

(58) Field of Classification Search
CPC . B62J 17/02; B62J 17/10; B62J 17/065; B62J 17/086; B62J 17/08; B62J 41/00
USPC ................................................ 296/78.1, 77.1
See application file for complete search history.

(56) References Cited

U.S. PATENT DOCUMENTS 7,448,461 B2 * 11/2008 Misaki .................... B62J 17/02 180/68.1
7,607,712 B2 * 10/2009 Suita ....................... B62J 17/02 296/78.1
8,006,792 B2 * 8/2011 Nakao ...................... B62J 17/10 180/68.1
8,631,888 B2 * 1/2014 Iida ......................... B62J 17/10 180/68.1
8,783,399 B2 * 7/2014 Maeda ................... B62K 11/04 180/68.1
2007/0149105 A1 * 6/2007 Nakagome ........... F02M 35/162 454/136
2018/0086406 A1 * 3/2018 Janyapanich ............ B62J 17/10

FOREIGN PATENT DOCUMENTS

JP 2005-047502 A 2/2005
WO WO-2011093184 A1 * 8/2011 ............. B62J 17/02

OTHER PUBLICATIONS

Translation of WO 2011093184 (Year: 2011).*

* cited by examiner

*Primary Examiner* — Amy R Weisberg
*Assistant Examiner* — Veronica M Condo
(74) *Attorney, Agent, or Firm* — Stein IP LLC

(57) ABSTRACT

A cowling structure for a straddle-type vehicle. The cowling structure includes a front cowling covering a vehicle front portion from a front side, and a pair of side cowlings covering the vehicle front portion from lateral sides. The pair of side cowlings each includes an outer cowling forming an outer surface of the side cowling, and an inner cowling forming an inner surface of the side cowling. The outer cowling at least includes a first outer cowling facing a first region of the inner cowling, a second outer cowling facing a second region of the inner cowling, and a third outer cowling covering, from an outer side in a vehicle width direction, a joint between the first outer cowling and the second outer cowling.

9 Claims, 12 Drawing Sheets

FR
RE
16
106
95
93
66
15
47
19
18
91
99
101
97
104a
104b
103
102
48
12
46
10
92
11
22
21
98
94
66
95
98
93
94

FR
RE
16
51
52
53
23
54
106
55
72
105
66
91
99
96b
97
101
15
104a
103
104b
102
104c
48
12
46
24
96a
95
93
94
47
98
92
L1
10
22
11
21

A-A CROSS SECTION

B-B CROSS SECTION

C-C CROSS SECTION

D-D CROSS SECTION

E-E CROSS SECTION

F-F CROSS SECTION

COWLING STRUCTURE

CROSS-REFERENCE TO RELATED APPLICATIONS

This application is based on and claims priority under 35 USC 119 from Japanese Patent Application No. 2023-014344 filed on Feb. 2, 2023, the entire content of which is incorporated herein by reference.

TECHNICAL FIELD

The present disclosure relates to a cowling structure.

BACKGROUND ART

A straddle-type vehicle such as a motorcycle is known in which a vehicle front portion is covered with a front cowling from a front side, and the vehicle front portion is covered with a pair of side cowlings from lateral sides (for example, see JP2005-047502A). The side cowling described in JP2005-047502A is divided into an upper cowling and a lower cowling, and outer edges of the upper cowling and the lower cowling are joined to each other to form an outer surface of the side cowling. In general, various fixing methods such as screwing, clipping, and hooking are adopted for joining the upper cowling and the lower cowling.

In recent years, demands for the appearance quality of a joint between the cowlings are becoming stricter, and in a structure in which the joint between the cowlings is exposed to the outside, it is necessary to control a gap between the cowlings in a severe manner. Further, it is not preferable in appearance to expose a fastening member such as a bolt or a clip to the outside.

SUMMARY OF INVENTION

Aspect of non-limiting embodiments of the present disclosure relates to provide a cowling structure that can improve appearance by hiding a joint between cowlings.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a cowling structure for a straddle-type vehicle, the cowling structure including:

- a front cowling covering a vehicle front portion from a front side; and
- a pair of side cowlings covering the vehicle front portion from lateral sides,
- in which the pair of side cowlings each includes:
  - an outer cowling forming an outer surface of the side cowling; and
  - an inner cowling forming an inner surface of the side cowling, and
- in which the outer cowling at least includes:
  - a first outer cowling facing a first region of the inner cowling;
  - a second outer cowling facing a second region of the inner cowling; and
  - a third outer cowling covering, from an outer side in a vehicle width direction, a joint between the first outer cowling and the second outer cowling.

BRIEF DESCRIPTION OF DRAWINGS

Exemplary embodiment(s) of the present invention will be described in detail based on the following figures, wherein.

DESCRIPTION OF EMBODIMENTS

A straddle-type vehicle according to one aspect of the present disclosure employs a cowling structure in which a vehicle front portion is covered by a front cowling from a front side, and the vehicle front portion is covered by a pair of side cowlings from lateral sides. An outer surface of each side cowling is formed by an outer cowlings, and an inner surface of each side cowling is formed by an inner cowlings. The outer cowling includes at least first to third outer cowlings. The first outer cowling faces a first region of the inner cowling, the second outer cowling faces a second region of the inner cowling, and the third outer cowling covers, from an outer side in a vehicle width direction, a joint between the first outer cowling and the second outer cowling. The joint between the first outer cowling and the second outer cowling is hidden by the third outer cowling, so that it is not necessary to control a gap between the first outer cowling and the second outer cowling in a severe manner. Further, even in a case where the first outer cowling and the second outer cowling are coupled to each other by screwing or the like, fastening members such as bolts are not exposed to the outside, so that the appearance of the straddle-type vehicle can be improved.

Embodiment

Figure 1:
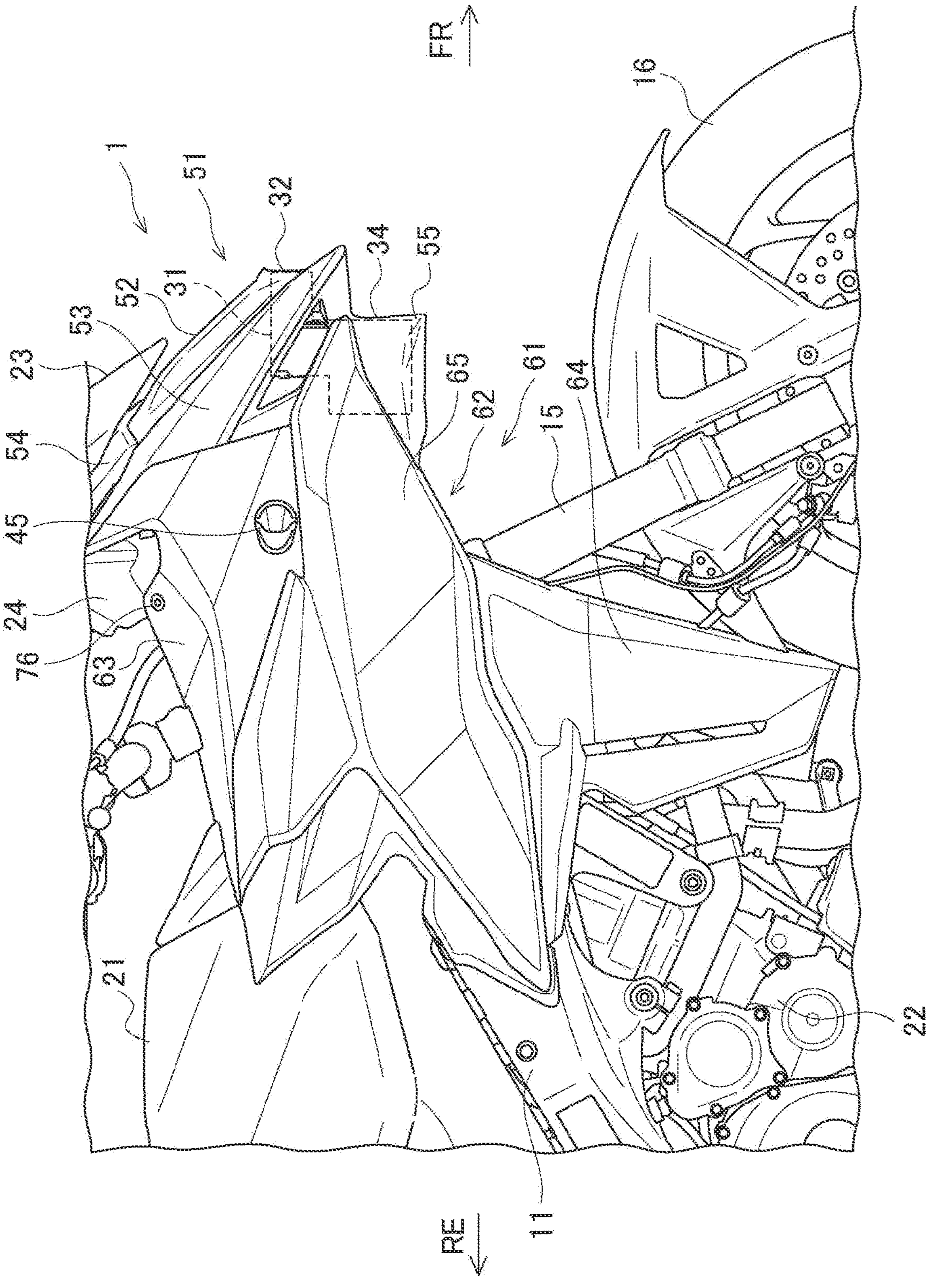
FIG. 1 is a right side view of a vehicle front portion of an exemplary embodiment of the present invention.
Figure 2:
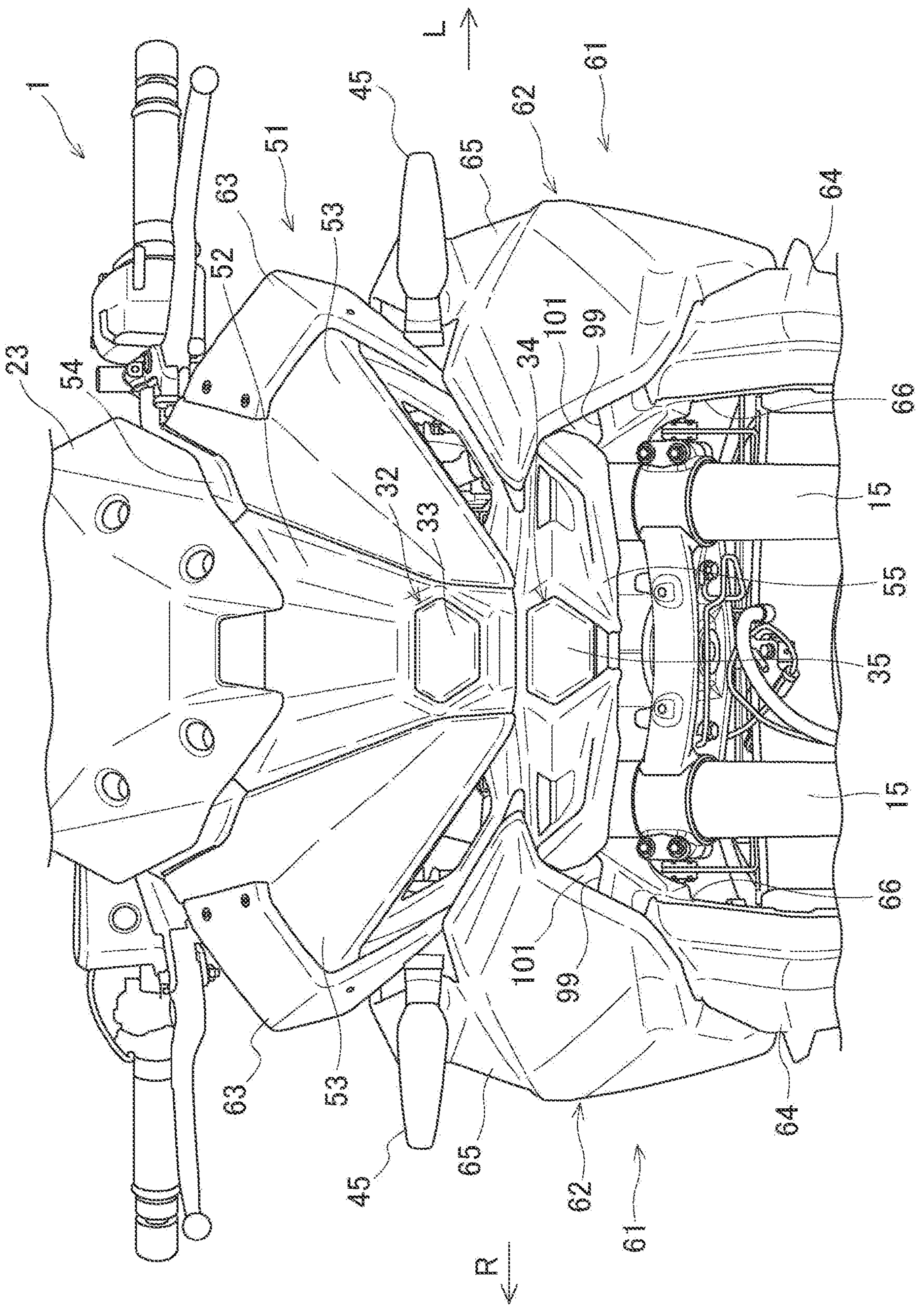
FIG. 2 is a front view of the vehicle front portion of an exemplary embodiment of the present invention.

Hereinafter, a cowling structure according to the present embodiment will be described with reference to the accompanying drawings. FIG. 1 is a right side view of a vehicle front portion of the present embodiment. FIG. 2 is a front view of the vehicle front portion of the present embodiment. In the following drawings, an arrow FR indicates a vehicle front side, an arrow RE indicates a vehicle rear side, an arrow L indicates a vehicle left side, and an arrow R indicates a vehicle right side.

As shown in FIG. 1, a front cowling 51 and a pair of side cowlings 61 are provided at the vehicle front portion of a straddle-type vehicle 1. The vehicle front portion is covered by the front cowling 51 from a front side, and the vehicle front portion is covered by the pair of side cowlings 61 from lateral sides. A front fork 15 protrudes toward a lower side from the side cowling 61, and a front wheel 16 is rotatably supported at a lower portion of the front fork 15. A main frame 11 protrudes toward a rear side from the side cowling 61, a fuel tank 21 is provided on an upper side of the main frame 11, and an engine 22 is provided on the lower side of the main frame 11.

A front end side of the front cowling 51 is formed into a beak shape in a side view. A front surface of the front cowling 51 is inclined obliquely rearward and upward from a front end, and a windscreen 23 for wind protection is attached to the upper side of the front surface of the front cowling 51. A lower surface of the front cowling 51 is formed in two upper and lower stages, and the lower surface on the rear side is one step lower than the lower surface on the front side of the front cowling 51. A meter cover 24 is attached to the rear side of the front cowling 51. A headlamp unit 31 having an upper headlamp 32 and a lower headlamp 34 is located inside the front cowling 51.

The pair of side cowlings 61 extends toward the rear side from the front cowling 51 to the front side of the fuel tank 21, and extends toward the lower side from the front cowling 51 to the rear side of the front wheel 16. Similarly to the front end side of the front cowling 51, a front end side of each side cowling 61 (outer middle cowling 65) is also formed into a beak shape in side view. The upper side of a front edge of each side cowling 61 is inclined obliquely upward and rearward from a front end, and the lower side of the front edge of each side cowling 61 is inclined obliquely downward and rearward from the front end. The pair of side cowlings 61 are connected to the rear side of the front cowling 51, and a streamline shape that reduces air resistance from traveling wind is formed at the vehicle front portion of the straddle-type vehicle 1.

As shown in FIGS. 1 and 2, the center of the front surface of the front cowling 51 is formed by a front center cowling 52, and both left and right sides of the front surface of the front cowling 51 are formed by a pair of front side cowlings 53. The upper side of the front surface of the front cowling 51 is formed by a front upper cowling 54, and the lower side of the front surface of the front cowling 51 is formed by a front lower cowling 55. A lens surface 33 of the upper headlamp 32 is exposed to the front side through an opening of the front center cowling 52, and a lens surface 35 of the lower headlamp 34 is exposed to the front side through an opening of the front lower cowling 55.

An outer surface of each of the pair of side cowlings 61 is formed by an outer cowlings 62, and an inner surface of each of the pair of side cowlings 61 is formed by an inner cowlings 66. The outer cowling 62 is formed by combining an outer upper cowling (first outer cowling) 63, an outer lower cowling (second outer cowling) 64, and an outer middle cowling (third outer cowling) 65. A turn signal lamp 45 protrudes laterally from the outer upper cowling 63. The outer cowling 62 and the inner cowling 66 are overlapped in a left-right direction to form each side cowling 61 hollow. A space for accommodating electrical components is secured inside each side cowling 61.

In recent years, demands for the appearance quality of an outer cowling in which a plurality of cowling members are combined are becoming stricter. In a structure in which a joint between the cowlings is exposed to the outside, it is necessary to control a gap in a severe manner. Further, it is not desirable to expose a fastening member such as a screw, a bolt, and a clip to the outside in terms of appearance quality. Therefore, in the straddle-type vehicle 1 of the present embodiment, the outer middle cowling 65 is provided to cover a joint between the outer upper cowling 63 and the outer lower cowling 64, which makes it easier to manage the gap and improves appearance.

Figure 3:
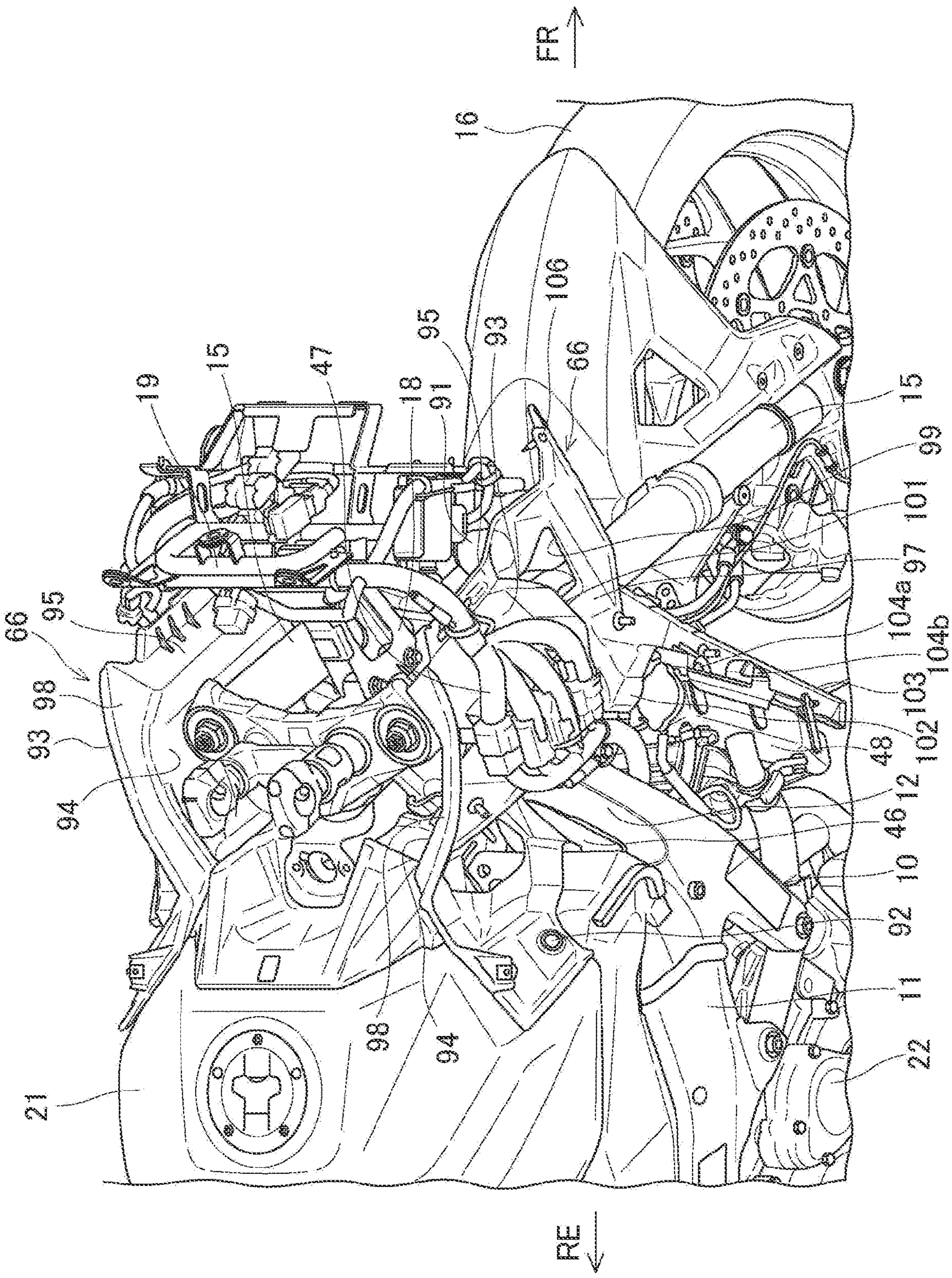
FIG. 3 is a perspective view showing an internal structure of the vehicle front portion of an exemplary embodiment of the present invention.
Figure 4:
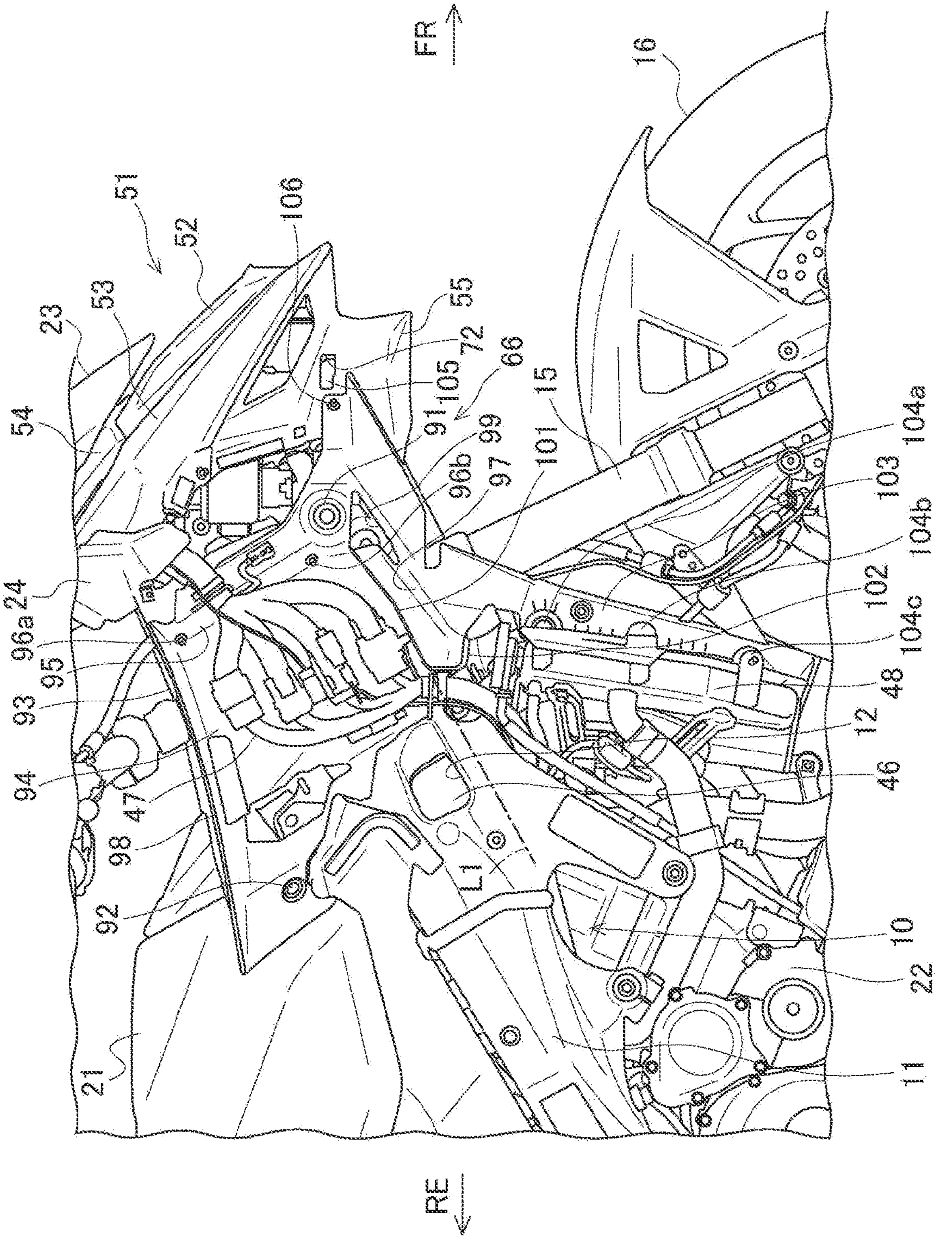
FIG. 4 is a right side view in which a part of a cowling is removed from the vehicle front portion of an exemplary embodiment of the present invention.
Figure 5:
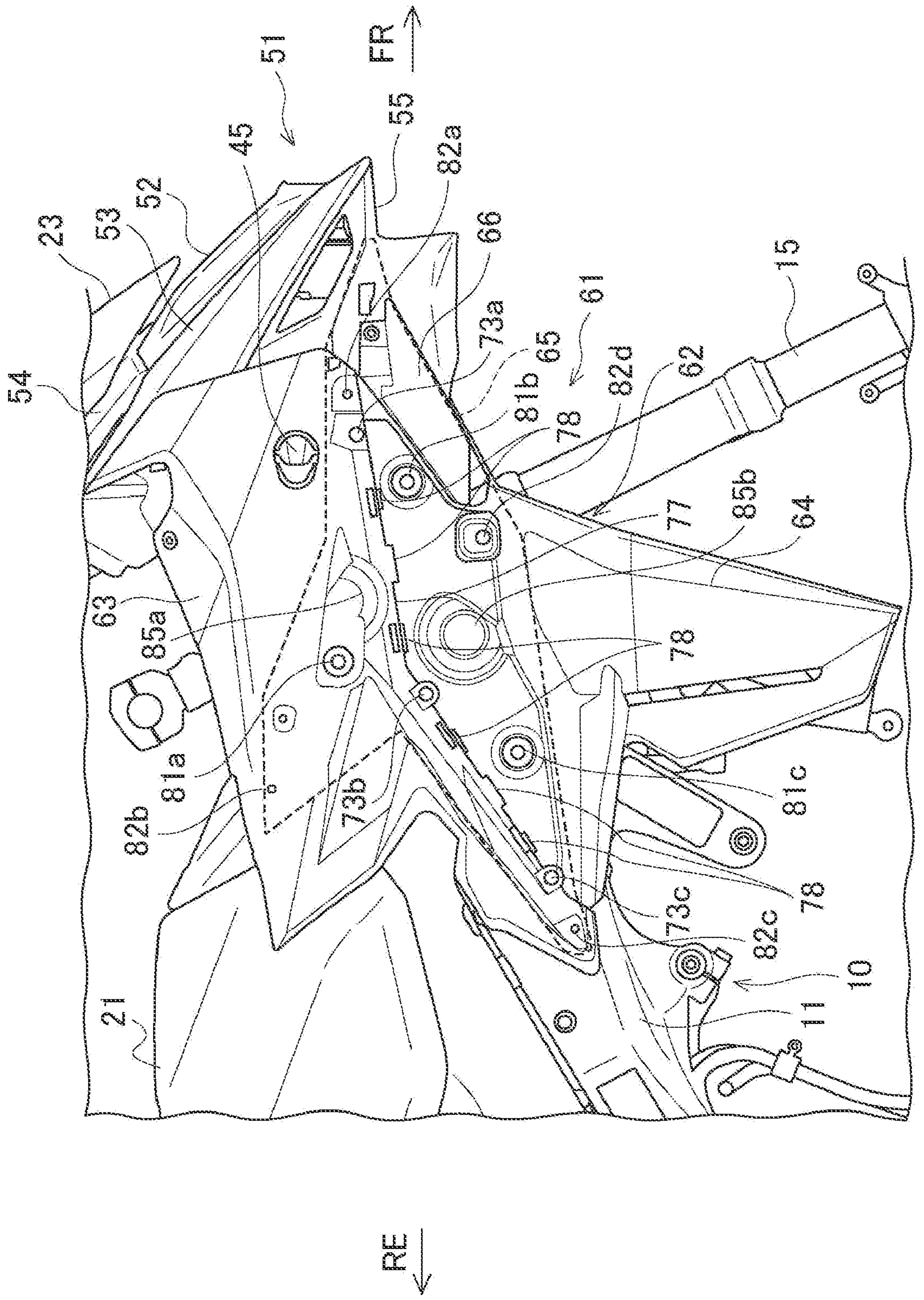
FIG. 5 is a right side view in which a part of the cowling is removed from the vehicle front portion of an exemplary embodiment of the present invention.

The cowling structure will be described with reference to FIGS. 3 to 5. FIG. 3 is a perspective view showing an internal structure of the vehicle front portion of the present embodiment. FIGS. 4 and 5 are right side views in which a part of the cowling is removed from the vehicle front portion of the present embodiment. FIG. 3 shows a state in which the front cowling and the outer cowling are removed, and FIG. 4 shows a state in which the outer cowling is removed. In FIG. 5, the outer middle cowling is indicated by a two-dot chain line.

As shown in FIG. 3, a cowling brace 19 is supported by a front portion of a vehicle body frame 10 via a brace bracket 18. The cowling brace 19 is formed by integrating a metal pipe and a metal bracket by welding. The headlamp unit 31 (see FIG. 1) and the front cowling 51 (see FIG. 1) are supported by the front side of the cowling brace 19. Tubular front fixing portions 91 protruding toward an inner side in the vehicle width direction from front sides of the pair of inner cowling 66 are respectively screwed to left and right sides of the cowling brace 19. The pair of inner cowlings 66 are connected to each other via the cowling brace 19.

The rear sides of positions along front edges of the pair of inner cowlings 66 bulge toward the inner side in the vehicle width direction. A side wall 94 of a bulging portion 93 of each inner cowling 66 is curved in an arch shape in a top view not to interfere with the front fork 15. More specifically, a portion from a front end to an intermediate portion of the side wall 94 of the bulging portion 93 curves toward an outer side in the vehicle width direction. A portion from the intermediate portion to a rear end of the side wall 94 of the bulging portion 93 curves toward the inner side in the vehicle width direction. Accordingly, even when the front fork 15 swings, a distance between the front fork 15 and the bulging portion 93 of the inner cowling 66 is appropriately maintained. A rear fixing portion 92 located on the rear side of the bulging portion 93 is screwed to the fuel tank 21.

As shown in FIGS. 3 and 4, the bulging portion 93 having a rectangular shape in a side view is located on the rear side than the front cowling 51, a front wall 95 of the bulging portion 93 is inclined obliquely upward to the rear side, and a lower wall 97 of the bulging portion 93 is inclined obliquely downward to the rear side. The ventilation hole 99 is formed on the front side of the lower wall 97 of the bulging portion 93 to allow traveling wind passing through the lower side of the front cowling 51 to blow toward the rear side. Even if the lower wall 97 of the bulging portion 93 is inclined obliquely downward to the rear side, since the traveling wind blows toward the rear side through the ventilation hole 99, upward force is less likely to be generated at the vehicle front portion. Since the front fixing portion 91 is positioned directly above the ventilation hole 99, vibration when traveling wind passes through the ventilation hole 99 is reduced.

The inner cowling 66 is formed with a wind guide wall 101 extending obliquely rearward to the rear side from an upper edge of the ventilation hole 99. The wind guide wall 101 is inclined at a shallow angle with respect to a horizontal direction, and even if traveling wind flows in the horizontal direction from the ventilation hole 99, the traveling wind does not hit the wind guide wall 101 strongly. The wind guide wall 101 smoothly guides the traveling wind that has entered the ventilation hole 99 rearward, thereby reducing air resistance that the inner cowling 66 receives from the traveling wind. In addition, the wind guide wall 101 is positioned at the back of the ventilation hole 99 in a front view, and the inside of the inner cowling 66 is hidden by the wind guide wall 101, so that appearance is improved (see FIG. 2).

An opening 12 connected to an inlet 46 of an air cleaner (not shown) is formed in a front portion of the main frame 11. The wind guide wall 101 extends from the ventilation hole 99 toward the inlet 46 of the air cleaner, and the wind guide wall 101 is configured to guide traveling wind to the inlet 46 of the air cleaner, thereby improving air intake efficiency. In this case, in a side view, an extension line L1 obtained by extending a downstream wall surface of the wind guide wall 101 is located on the lower side of the inlet 46 of the air cleaner. By the traveling wind passing through the wind guide wall 101, a direction of the traveling wind is directed downward than the inlet 46 of the air cleaner, and intrusion of foreign matters such as sand into the inlet 46 of the air cleaner is reduced.

An accommodation space for electrical components is formed inside the bulging portion 93 of the inner cowling 66. A harness 47 is installed as an electrical component in the accommodation space. The wind guide wall 101 extends to separate the accommodation space and a flow path of the traveling wind entering from the ventilation hole 99. Thus, even if foreign matters such as sand or water droplets enter from the ventilation hole 99, the harness 47 is protected from the foreign matters by the wind guide wall 101. The outer cowling 62 (see FIG. 1) is superposed on the inner cowling 66, and rigidity of the side cowling 61 is increased by a hollow closed section. The harness 47 is hidden inside the side cowling 61, so that the appearance is improved, and the harness 47 is protected from flying stones or the like.

An upper wall 98 protrudes toward the outer cowling 62, from an upper end of the side wall 94 of the inner cowling 66 (bulging portion 93). The upper wall 98 of the inner cowling 66 extends in a front-rear direction similarly to the wind guide wall 101, and the upper wall 98 of the inner cowling 66 and the wind guide wall 101 face each other in an upper-lower direction. The inner cowling 66 is reinforced by a concave cross section formed by the upper wall 98, the wind guide wall 101, and the side wall 94 of the inner cowling 66, and the rigidity of the inner cowling 66 is increased. In this way, the wind guide wall 101 not only guides the traveling wind, but also functions as a separation wall that separates the accommodation space and the flow path, and a rib that reinforces the bulging portion 93.

A radiator 48 is provided on the lower side of the vehicle front portion, and a partition wall 102 protrudes from the side wall 94 of the inner cowling 66 toward the outer cowling 62 to partition the inside of the inner cowling 66 and the upper side of the radiator 48. Hot air flowing upward from the radiator 48 is blocked by the partition wall 102, and therefore, heat damage to the harness 47 installed in the inner cowling 66 is reduced. Although the partition wall 102 of the inner cowling 66 is connected to a rear end of the wind guide wall 101 and partially blocks the flow path of the traveling wind, an amount of protrusion of the partition wall 102 is reduced to the minimum so that a flow of the traveling wind is not strongly blocked.

An extending portion 103 extends downward from the bulging portion 93 of the inner cowling 66, and the lower fixing portions 104*a* to 104*c* of the extending portion 103 are screwed to the radiator 48. The front fixing portions 91, the rear fixing portions 92, and the lower fixing portions 104*a* to 104*c*, which are spaced apart in the front-rear and upper-lower directions of the inner cowling 66, are screwed to the vehicle front portion, thereby stably supporting the side cowling 61. The extending portion 103 extends along a side surface of the radiator 48 in front of the radiator 48. The extending portion 103 functions as a wind guide plate configured to guide traveling wind to the radiator 48, and cooling efficiency is improved by the traveling wind flowing to the radiator 48 along the extending portion 103.

The front cowling 51 is formed by three-dimensionally combining cowling members of the front center cowling 52, the pair of front side cowlings 53, the front upper cowling 54, and the front lower cowling 55. The adjacent cowling members are clipped to each other. Further, the meter cover 24 is clipped to the pair of the front side cowlings 53 and the front upper cowling 54. The front wall 95 of the bulging portion 93 of the inner cowling 66 is in contact with the meter cover 24, and two upper and lower portions 96*a* and 96*b* of the front wall 95 of the bulging portion 93 are clipped to the meter cover 24.

An insertion hole 72 is formed in the front lower cowling 55. A hook 105 is formed in the inner cowling 66. The hook 105 is inserted into the insertion hole 72, and the front lower cowling 55 and the inner cowling 66 are latched. The vicinity of a tip end of the inner cowling 66 is in contact with the front lower cowling 55. A tip end portion 106 of the inner cowling 66 is clipped to the front lower cowling 55. The outer upper cowling 63 (see FIG. 1) is in contact with the meter cover 24. A front portion 76 (see FIG. 1) of the outer upper cowling 63 is screwed to the meter cover 24.

Thus, an upper portion of the front cowling 51 is fixed to the front wall 95 of the bulging portion 93 and the front portion 76 of the outer cowling 62 via the meter cover 24. A lower portion of the front cowling 51 is fixed to the tip end portion 106 of the inner cowling 66. Since the pair of side cowlings 61 are supported at a plurality of positions in the vehicle front portion, the pair of side cowlings 61 function as a support structure of the front cowling 51 together with the cowling brace 19. As described above, the rigidity of the pair of side cowlings 61 is sufficiently increased, so that the front cowling 51 is stably supported by the pair of side cowlings 61.

As shown in FIG. 5, the outer upper cowling 63 and the outer lower cowling 64 are attached to the inner cowling 66. The outer upper cowling 63 faces an upper region of the inner cowling 66. The outer lower cowling 64 faces a lower region of the inner cowling 66. A lower edge of the outer upper cowling 63 is connected to an upper edge of the outer lower cowling 64. The outer middle cowling 65 is attached to cover, from the outer side in the vehicle width direction, a joint 77 between the outer upper cowling 63 and the outer lower cowling 64.

A plurality of hooks 71 (see FIG. 6) are formed at the lower edge of the outer upper cowling 63. A plurality of insertion holes 78 are formed at the upper edge of the outer lower cowling 64. The hooks 71 are inserted into the insertion holes 78 to latch the outer upper cowling 63 and the outer lower cowling 64. Fixing portions 73*a* to 73*c* are formed at three positions spaced apart in an extending direction at the lower edge of the outer upper cowling 63. The fixing portions 73*a* to 73*c* at the three positions are screwed to the upper edge of the outer lower cowling 64. The outer upper cowling 63 and the outer lower cowling 64 are connected at a plurality of positions along the joint 77.

A clip hole 81*a* is formed in the middle, in the front-rear direction, of the outer upper cowling 63. A clip hole 81*b* is formed on the front side, in the front-rear direction, of the outer lower cowling 64. A clip hole 81*c* is formed on the rear side, in the front-rear direction, of the outer lower cowling 64. Three clips (not shown) corresponding to the clip holes 81*a* to 81*c* are provided on an inner surface of the outer middle cowling 65. The clips of the outer middle cowling 65 are inserted, from the outer side in the vehicle width direction, into the clip holes 81*a* to 81*c* of the outer upper cowling 63 and the outer lower cowling 64 to position the outer middle cowling 65.

Fixing portions 82*a* to 82*d* corresponding to the front side, the rear side, the upper side, and the lower side of the outer middle cowling 65 are formed in the outer upper cowling 63 and the outer lower cowling 64. The fixing portion 82*a* is located in front of the clip hole 81*b*. The fixing portion 82*b* is located above the clip hole 81*a*. The fixing portion 82*c* is located behind the clip hole 81*c*. The fixing portion 82*d* is located below a straight line passing through the clip holes 81*b* and 81*c*. The outer middle cowling 65 is screwed to the four fixing portions 82*a* to 82*d* of the outer upper cowling 63 and the outer lower cowling 64.

The joint 77 between the outer upper cowling 63 and the outer lower cowling 64 is covered with the outer middle cowling 65 to improve the appearance of the straddle-type vehicle 1. In this case, the outer upper cowling 63 and the outer lower cowling 64 are screwed to the outer middle cowling 65 from the inner side in the vehicle width direction. No screw holes pass through the outer middle cowling 65, and fastening members of the cowling members are not exposed to the outside. By assembling the outer cowling 62 in advance, the work of attaching the outer cowling 62 to the inner cowling 66 becomes easier.

Further, although there is a gap at the joint 77 between the outer upper cowling 63 and the outer lower cowling 64, the gap is covered by the outer middle cowling 65, so that an allowable width of the gap is widened. The fixing portion 82*b* at a fixing position of the outer upper cowling 63 and the outer middle cowling 65 is positioned at an opposite side, with respect to the joint 77, of the fixing portion 82*d* at a fixing position of the outer lower cowling 64 and the outer middle cowling 65. Two portions spaced apart in the upper-lower direction of the outer upper cowling 63 and the outer lower cowling 64 are connected to each other via the outer middle cowling 65, thereby increasing the overall rigidity of the outer cowling 62.

The outer upper cowling 63 and the outer lower cowling 64 are manufactured by injection molding in which a mold is filled with molten resin. Therefore, gate marks 85*a* and 85*b* remain on the outer upper cowling 63 and the outer lower cowling 64. The gate marks 85*a* and 85*b* are covered with the outer middle cowling 65. Since the gate marks 85*a* and 85*b* are hidden by the outer middle cowling 65, the gate at the time of injection molding is increased in size to improve the degree of freedom in design without considering the influence on the appearance of the outer upper cowling 63 and the outer lower cowling 64.

Figure 6:
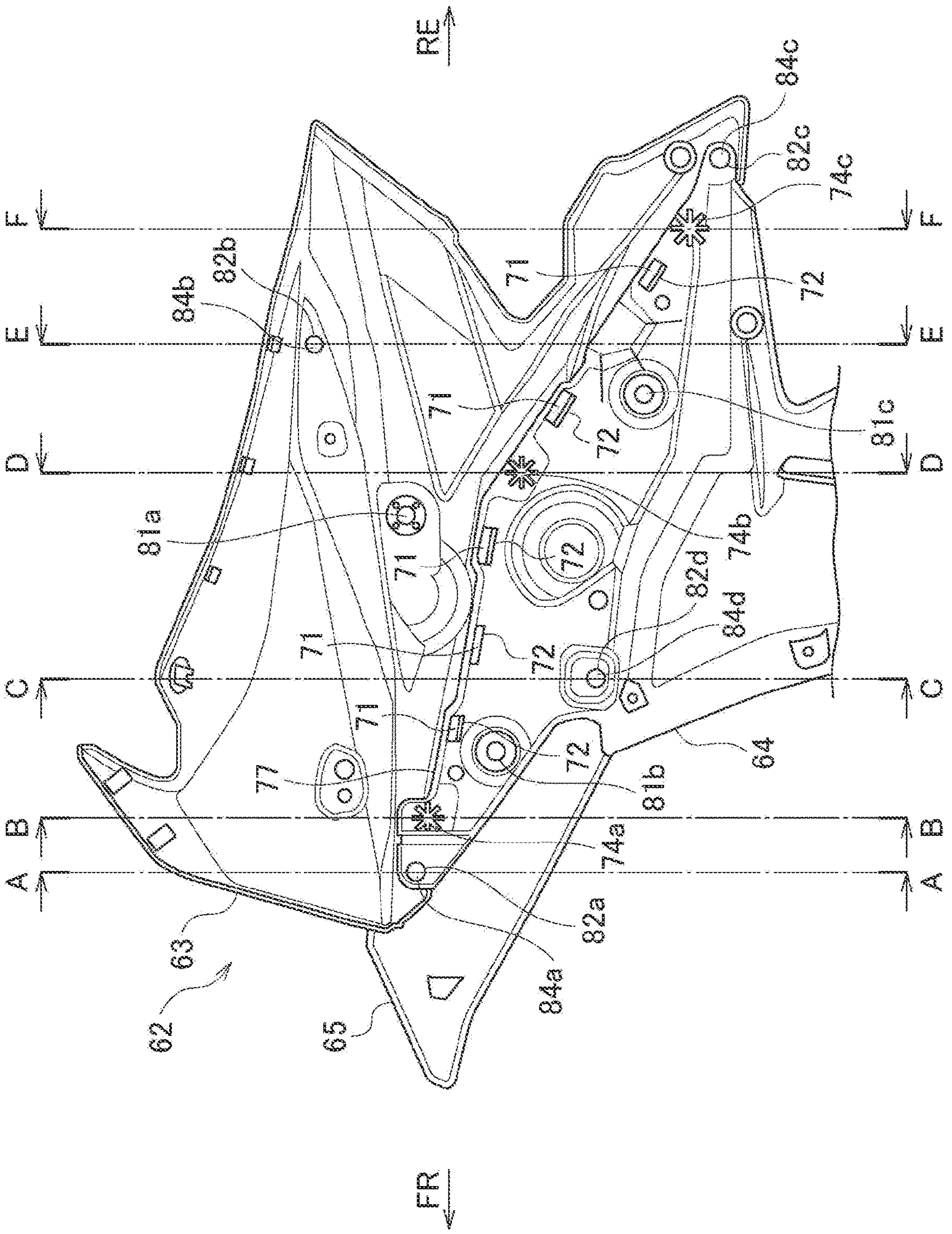
FIG. 6 is a side view of an outer cowling of an exemplary embodiment of the present invention as viewed from the inside.
Figure 7A:
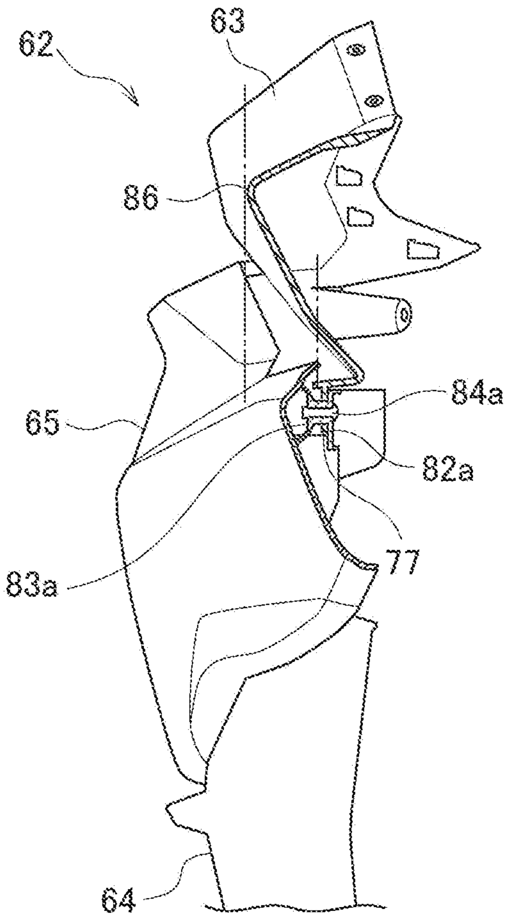
FIG. 7A is a cross-sectional view of a front side of the outer cowling in FIG. 6.
Figure 7B:
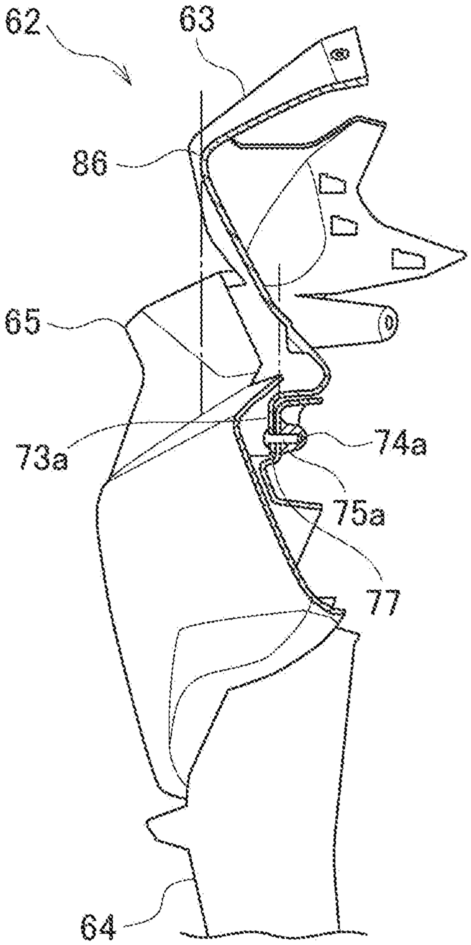
FIG. 7B is a cross-sectional view of a front side of the outer cowling in FIG. 6.
Figure 7C:
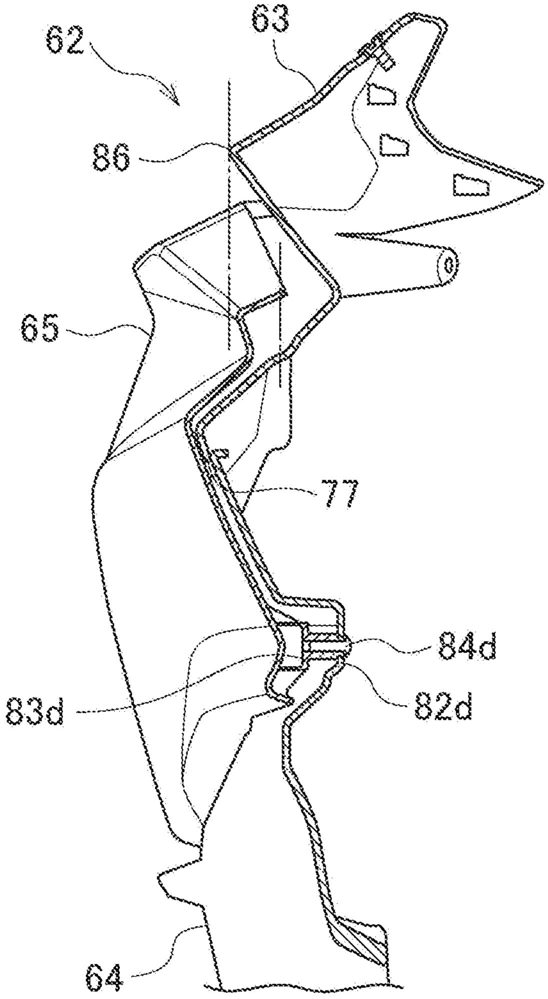
FIG. 7C is a cross-sectional view of a front side of the outer cowling in FIG. 6.
Figure 8A:
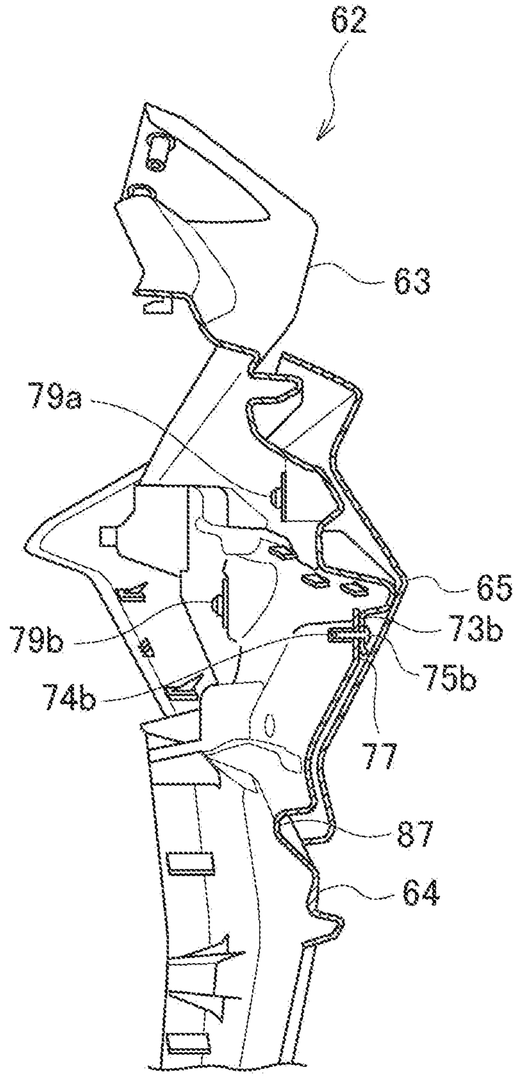
FIG. 8A is a cross-sectional view of a rear side of the outer cowling in FIG. 6.
Figure 8B:
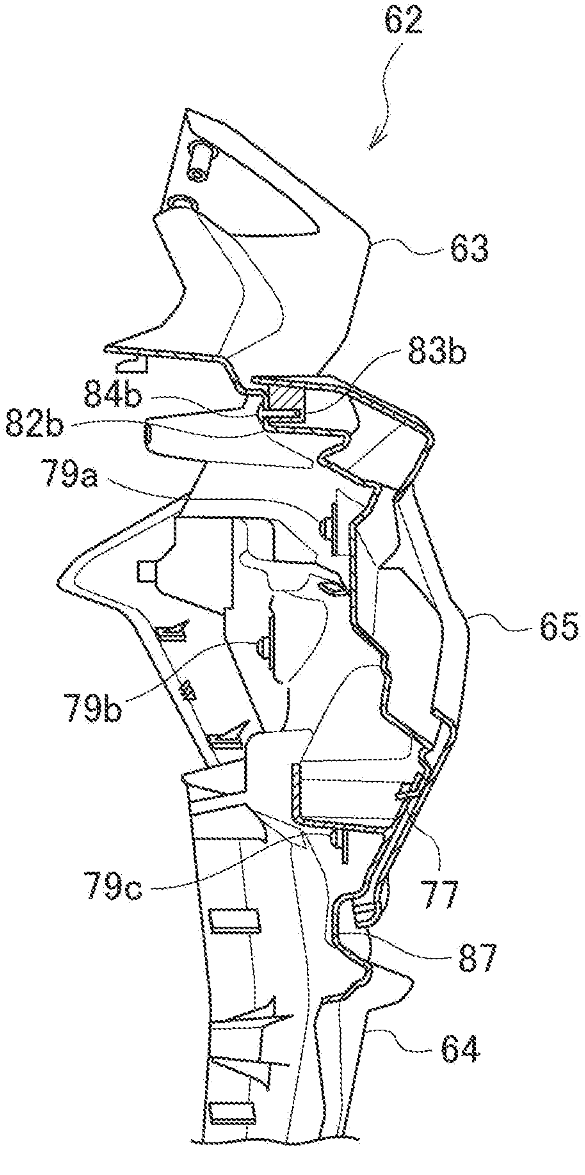
FIG. 8B is a cross-sectional view of a rear side of the outer cowling in FIG. 6.
Figure 8C:
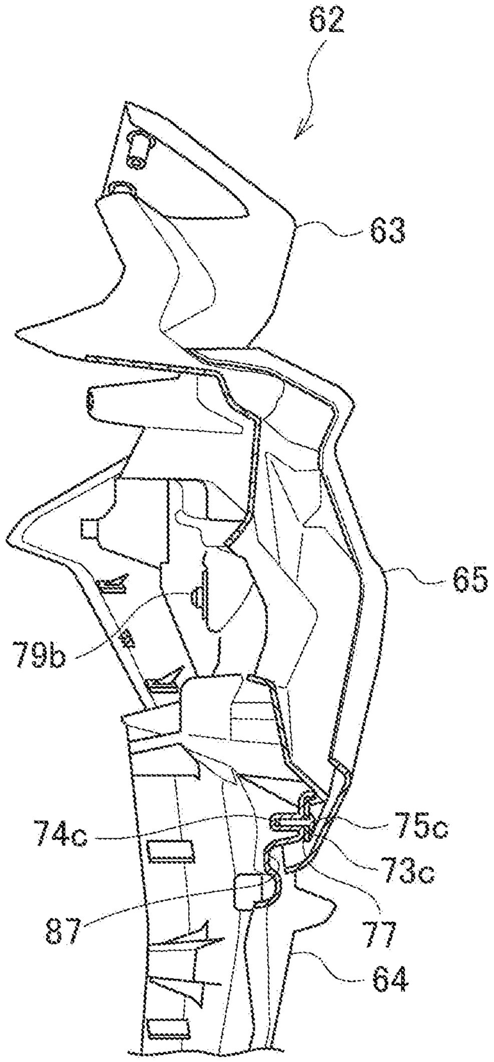
FIG. 8C is a cross-sectional view of a rear side of the outer cowling in FIG. 6.

A detailed configuration of the outer cowling will be described with reference to FIGS. 6 to 8C. FIG. 6 is a side view of the outer cowling of the embodiment as viewed from the inside. FIGS. 7A to 7C are cross-sectional views of a front side of the outer cowling in FIG. 6. FIGS. 8A to 8C are cross-sectional views of a rear side of the outer cowling in FIG. 6. FIGS. 7A to 7C are cross-sectional views of the outer cowling in FIG. 6 taken along lines A-A, B-B, and C-C. FIGS. 8A to 8C are cross-sectional views of the outer cowling in FIG. 6 taken along lines D-D, E-E, and F-F.

As shown in FIG. 6, the plurality of hooks 71 of the outer upper cowling 63 are inserted into the plurality of insertion holes 72 of the outer lower cowling 64, and the lower edge of the outer upper cowling 63 and the upper edge of the outer lower cowling 64 are hooked together. Female screw portions 74*a* to 74*c* are formed on the upper edge of the outer lower cowling 64 in correspondence with the fixing portions 73*a* to 73*c* (see FIG. 5) of the outer upper cowling 63. The fixing portions 73*a* to 73*c* of the outer upper cowling 63 and the female screw portions 74*a* to 74*c* of the outer lower cowling 64 are fixed by bolts 75*a* to 75*c* from the outside (see FIG. 7B, FIG. 8A, and FIG. 8C).

Clips 79*a* to 79*c* of the outer middle cowling 65 are inserted into the clip holes 81*a* to 81*c* of the outer upper cowling 63 and the outer lower cowling 64 (see FIGS. 8A and 8B). Female screw portions 83*a*, 83*b*, and 83*d* (female screw portion corresponding to the fixing portion 82*c* is omitted) are formed on the inner surface of the outer middle cowling 65 in correspondence with the fixing portions 82*a* to 82*d* of the outer upper cowling 63 and the outer lower cowling 64. The fixing portions 82*a* to 82*d* of the outer upper cowling 63 and the outer lower cowling 64, and the female screw portions 83*a*, 83*b*, 83*d* of the outer middle cowling 65 are fixed by bolts 84*a* to 84*d* from the inside (see FIGS. 7A, 7C, and 8B).

As shown in FIGS. 7A to 8C, an outer edge of the outer middle cowling 65 is not in contact with outer surfaces of the outer upper cowling 63 and the outer lower cowling 64 to form a gap. The gap is not visible from the lateral side, so that it is not necessary to control the gap in a severe manner. The outer edge (upper edge and lower edge) of the outer middle cowling 65 is bent toward the inner side in the vehicle width direction. The gap between the outer edge of the outer middle cowling 65 and the outer surface of the outer upper cowling 63 and the like is narrow. The fluctuation of the gap caused by a fixing error of the outer middle cowling 65 becomes less noticeable, and the appearance of the straddle-type vehicle 1 is improved.

At least one of the upper edge or the lower edge of the outer middle cowling 65 is located on the inner side, in the vehicle width direction, of the joint 77 between the outer upper cowling 63 and the outer lower cowling 64. For example, in FIG. 7A, the lower edge of the outer middle cowling 65 is located on the inner side, in the vehicle width direction, of the joint 77. In FIGS. 7B and 7C, the upper edge and the lower edge of the outer middle cowling 65 are located on the inner side, in the vehicle width direction, of the joint 77. In FIGS. 8A and 8B, the upper edge and the lower edge of the outer middle cowling 65 are located on the inner side, in the vehicle width direction, of the joint 77. In FIG. 8C, the lower edge of the outer middle cowling 65 is located on the inner side, in the vehicle width direction, of the joint 77. The gap between the outer middle cowling 65 and the outer upper cowling 63 and the like becomes less noticeable.

As shown in FIGS. 7A to 7C, in a front half portion of the outer upper cowling 63, a bulging portion 86 is formed such that a portion of the bulging portion 86 above the outer middle cowling 65 bulges to the outer side in the vehicle width direction. The bulging portion 86 of the outer upper cowling 63 is located on the outer side, in the vehicle width direction, of the upper edge of the outer middle cowling 65. When the outer cowling 62 is viewed obliquely upward or from above, the gap between the outer middle cowling 65 and the outer upper cowling 63 is located in a blind spot of the bulging portion 86 of the outer upper cowling 63. Therefore, the gap between the outer middle cowling 65 and the outer upper cowling 63 becomes less noticeable.

As shown in FIGS. 8A to 8C, outer lower cowling 64 has a recess 87. A portion of the recess 87 lower than the outer middle cowling 65 is recessed toward the inner side in the vehicle width direction. The recess 87 of the outer lower cowling 64 extends in the front-rear direction along the lower edge of the outer middle cowling 65. The lower edge of the outer middle cowling 65 is located in the recess 87 of the outer lower cowling 64. When the outer cowling 62 is viewed from above, the lower edge of the outer middle cowling 65 is hidden, and the gap between the outer middle cowling 65 and the outer upper cowling 63 becomes less noticeable.

As described above, according to the cowling structure of the present embodiment, the joint 77 between the outer upper cowling 63 and the outer lower cowling 64 is hidden by the outer middle cowling 65. Therefore, it is not necessary to control the gap between the outer upper cowling 63 and the outer lower cowling 64 in a severe manner. Even when the outer upper cowling 63 and the outer lower cowling 64 are coupled to each other by screwing or the like, fastening members such as bolts are not exposed to the outside, so that the appearance of the straddle-type vehicle 1 can be improved.

In the present embodiment, the front cowling is formed by combining a plurality of cowling members. Alternatively, the front cowling may be formed by one cowling member.

Further, in the present embodiment, the outer cowling is formed by combining a plurality of cowling members. Alternatively, the outer cowling may be formed by one cowling member.

Further, in the present embodiment, the outer upper cowling is exemplified as the first outer cowling, but the first outer cowling is not limited to the cowling facing the upper region of the inner cowling. Similarly, the outer lower cowling is exemplified as the second outer cowling, but the second outer cowling is not limited to the cowling facing the lower region of the inner cowling. The first outer cowling may be a cowling facing one region of the inner cowling, and the second outer cowling may be a cowling facing another region of the inner cowling.

Further, in the present embodiment, the outer cowling is formed by the outer upper cowling, the outer lower cowling, and the outer middle cowling. Alternatively, the outer cowling may be formed by four or more cowlings.

Further, a fixing method of the various cowlings is not particularly limited, and fixing methods such as screwing, latching, clipping, and the like may be used as appropriate.

Further, the cowling structure according to the present embodiment is not limited to the above-described straddle-type vehicle, and may be used in other types of straddle-type vehicles. The straddle-type vehicle is not limited to a general vehicle in which a driver rides on a seat in a posture of straddling the seat, and includes a scooter-type vehicle in which the driver rides on the seat without straddling the seat.

As described above, a first aspect relates to a cowling structure for a straddle-type vehicle (1), the cowling structure including: a front cowling (51) covering a vehicle front portion from a front side; and a pair of side cowlings (61) covering the vehicle front portion from lateral sides, in which the pair of side cowlings each include: an outer cowling (62) forming an outer surface of the side cowling, and an inner cowling (66) forming an inner surface of the side cowling, and the outer cowling at least includes a first outer cowling (outer upper cowling 63) facing a first region of the inner cowling, a second outer cowling (outer lower cowling 64) facing a second region of the inner cowling, and a third outer cowling (outer middle cowling 65) covering, from an outer side in a vehicle width direction, a joint (77) between the first outer cowling and the second outer cowling. According to this configuration, the joint between the first outer cowling and the second outer cowling is hidden by the third outer cowling, so that it is not necessary to control a gap between the first outer cowling and the second outer cowling in a severe manner. Further, even in a case where the first outer cowling and the second outer cowling are coupled to each other by screwing or the like, fastening members such as bolts are not exposed to the outside, so that the appearance of the straddle-type vehicle can be improved.

A second aspect is directed to the first aspect, in which the first outer cowling and the second outer cowling are fixed to the third outer cowling from an inner side in the vehicle width direction. According to this configuration, the fastening member is not exposed to the outside, so that the appearance of the straddle-type vehicle can be improved. By assembling the outer cowling in advance, the work of attaching the outer cowling to the inner cowling becomes easier.

A third aspect is directed to the first aspect and the second aspect, in which an outer edge of the third outer cowling is not in contact with outer surfaces of the first outer cowling and second outer cowling. According to this configuration, since the gap between the third outer cowling and the first and second outer cowlings cannot be seen from the lateral side, it is not necessary to control the gap between the outer edge of the third outer cowling and the outer surfaces of the first and second outer cowlings in a severe manner.

A fourth aspect is directed to the third aspect, in which the outer edge of the third outer cowling is bent to an inner side in the vehicle width direction. According to this configuration, the gap between the outer edge of the third outer cowling and the outer surfaces of the first and second outer cowlings is narrowed. The fluctuation of the gap caused by a fixing error of the third outer cowling becomes less noticeable, and the appearance of the straddle-type vehicle is improved.

A fifth aspect is directed to any one of the first aspect to the fourth aspect, in which the first outer cowling faces an upper region of the inner cowling, the second outer cowling faces a lower region of the inner cowling, and at least one of an upper edge or a lower edge of the third outer cowling is located on an inner side in the vehicle width direction than a joint between the first outer cowling and the second outer cowling. According to this configuration, the gap between at least one of the upper edge or the lower edge of the third outer cowling and the outer surfaces of the first and second outer cowlings is less noticeable, and the appearance of the straddle-type vehicle is improved.

A sixth aspect is directed to the fifth aspect, in which a front half portion of the first outer cowling is formed with a bulging portion (86), a portion of the bulging portion above the third outer cowling bulging toward the outer side in the vehicle width direction, and the bulging portion of the first outer cowling is located on the outer side in the vehicle width direction than the upper edge of the third outer cowling. According to this configuration, the outer cowling is viewed obliquely upward or from above, the gap between the third outer cowling and the first outer cowling is located in a blind spot of the bulging portion. The gap between the third outer cowling and the first outer cowling is less noticeable, and the appearance of the straddle-type vehicle is improved.

A seventh aspect is directed to the fifth aspect or the sixth aspect, in which the second outer cowling is formed with a recess (87), a portion of the recess below the third outer cowling being recessed toward the inner side in the vehicle width direction, and the lower edge of the third outer cowling is located in the recess of the second outer cowling. According to this configuration, when the outer cowling is viewed from above, the gap between the lower edge of the third outer cowling and the outer surface of the second outer cowling is less noticeable, and the appearance of the straddle-type vehicle is improved.

An eighth aspect is directed to any one of the first aspect to the seventh aspect, in which gate marks (85*a*, 85*b*) of the first outer cowling and second outer cowling are covered with the third outer cowling. According to this configuration, gate marks at the time of molding the first and second outer cowlings are hidden by the third outer cowling. The gate can be made larger during injection molding without considering an effect on the appearance of the cowlings, and the degree of freedom in design of the cowling is improved.

A ninth aspect is directed to any one of the first aspect to the eighth aspect, in which a first fixing location (fixing portion 82*b*) is positioned at an opposite side of a second fixing location (fixing portion 82*d*) with respect to the joint between the first outer cowling and the second outer cowling, the first fixing location is a location where the first outer cowling and the third outer cowling is fixed, the second fixing location is a location where the second outer cowling and the third outer cowling is fixed. According to this configuration, two separated portions of the first outer cowling and the second outer cowling are connected to each other via the third outer cowling, so that the overall rigidity of the outer cowling can be increased.

Although the present embodiment has been described, as another embodiment, the above-described embodiment and modification may be combined entirely or partially.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A cowling structure for a straddle-type vehicle, the cowling structure comprising:
- a front cowling covering a vehicle front portion from a front side; and
- a pair of side cowlings covering the vehicle front portion from lateral sides, wherein the pair of side cowlings each includes:
- an outer cowling forming an outer surface of the side cowling; and
- an inner cowling forming an inner surface of the side cowling, and wherein the outer cowling at least includes:
- a first outer cowling facing a first region of the inner cowling;
- a second outer cowling facing a second region of the inner cowling; and
- a third outer cowling covering, from an outer side in a vehicle width direction, a joint between a lower edge of the first outer cowling and an upper edge of the second outer cowling.

2. The cowling structure according to claim 1, wherein the first outer cowling and the second outer cowling are fixed to the third outer cowling from an inner side in the vehicle width direction.

3. The cowling structure according to claim 1, wherein an outer edge of the third outer cowling is not in contact with outer surfaces of the first outer cowling and second outer cowling.

4. The cowling structure according to claim 3, wherein the outer edge of the third outer cowling is bent to an inner side in the vehicle width direction.

5. The cowling structure according to claim 1, wherein the first outer cowling faces an upper region of the inner cowling, wherein the second outer cowling faces a lower region of the inner cowling, and wherein at least one of an upper edge or a lower edge of the third outer cowling is located on an inner side in the vehicle width direction than the joint between the first outer cowling and the second outer cowling.

6. The cowling structure according to claim 5, wherein a front half portion of the first outer cowling is formed with a bulging portion, a portion of the bulging portion above the third outer cowling bulging toward the outer side in the vehicle width direction, and wherein the bulging portion of the first outer cowling is located on the outer side in the vehicle width direction than the upper edge of the third outer cowling.

7. The cowling structure according to claim 5, wherein the second outer cowling is formed with a recess, a portion of the recess below the third outer cowling being recessed toward the inner side in the vehicle width direction, and wherein the lower edge of the third outer cowling is located in the recess of the second outer cowling.

8. The cowling structure according to claim 1, wherein gate marks of the first outer cowling and second outer cowling are covered with the third outer cowling.

9. The cowling structure according to claim 1, wherein a first fixing location is positioned at an opposite side of a second fixing location with respect to the joint between the first outer cowling and the second outer cowling, the first fixing location is a location where the first outer cowling and the third outer cowling is fixed, the second fixing location is a location where the second outer cowling and the third outer cowling is fixed.

* * * * *